United States Patent
Wolters, Jr. et al.

(10) Patent No.: US 6,785,692 B2
(45) Date of Patent: Aug. 31, 2004

(54) SYSTEMS AND METHODS FOR COORDINATING QA EVENTS

(75) Inventors: Richard Arthur Wolters, Jr., San Jose, CA (US); Christopher Alan Hansen, San Jose, CA (US); James Everett Boyden, San Jose, CA (US)

(73) Assignee: General Electric Company, Schenectady, NY (US)

( * ) Notice: Subject to any disclaimer, the term of this patent is extended or adjusted under 35 U.S.C. 154(b) by 86 days.

(21) Appl. No.: 09/682,493

(22) Filed: Sep. 7, 2001

(65) Prior Publication Data

US 2003/0050907 A1 Mar. 13, 2003

(51) Int. Cl.[7] .............................................. G06F 17/30
(52) U.S. Cl. .................... 707/104.1; 376/215; 376/245; 702/188
(58) Field of Search .............................. 707/104.1, 102, 707/101; 704/223, 220; 703/21; 376/215, 245; 700/26; 702/188; 714/38

(56) References Cited

U.S. PATENT DOCUMENTS

| | | | | |
|---|---|---|---|---|
| 4,700,318 A | * | 10/1987 | Ockman ...................... 345/595 |
| 5,887,041 A | * | 3/1999 | Zachar et al. ................ 376/248 |
| 6,128,687 A | * | 10/2000 | Dao et al. .................... 710/305 |
| 6,185,501 B1 | * | 2/2001 | Smith et al. ................. 701/200 |
| 6,405,364 B1 | * | 6/2002 | Bowman-Amuah ......... 717/101 |
| 6,449,588 B1 | * | 9/2002 | Bowman-Amuah .......... 703/21 |

* cited by examiner

*Primary Examiner*—Safet Metjahic
*Assistant Examiner*—Sana Al-Hashemi
(74) *Attorney, Agent, or Firm*—Armstrong Teasdale LLP

(57) ABSTRACT

A method is provided for coordinating QA event schedules using a network-based system. The system includes a server system coupled to a database and at least one client system. The method includes receiving QA event data and storing the QA event data in the database. The method further includes cross-referencing the QA event data, updating the database with the QA event data and providing information in response to an inquiry.

31 Claims, 10 Drawing Sheets

| GE HOME | GEPS HOME  FEEDBACK  FAQ |

WITNESS HOLD POINT GE INFORMATION AND UPDATES
RETURN TO QA HOME

ADD QUALITY CONTROL ENGINEER

| FIRST NAME: | | LAST NAME: | |
|---|---|---|---|
| TELEPHONE NUMBER: | | | |
| FAX NUMBER: | | | |
| ADDRESS: | | | |
| CITY: | | | |
| STATE: | | | |
| COUNTRY: | | | |
| ZIPCODE: | | | |
| PGAER NUMBER: | | | |
| CELL PHONE NUMBER: | | | |
| EMAIL: | | | |
| ADD QCE | RESET | | |

SYSTEMS AND METHODS FOR COORDINATING QA EVENTS

COPYRIGHT STATEMENT

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF INVENTION

This invention relates generally to coordination of quality assurance and, more particularly, to network-based systems and methods for coordination of quality assurance events, including witness/hold points and audits.

Quality assurance (QA) events, including witness/hold points, audits, and surveillances of critical or key events during construction or maintenance enhance product control and reliability. Particularly, in government regulated industries, such as construction, nuclear power production and aircraft maintenance, strict procedural compliance is necessary for product performance and safety. Designated quality control engineers (QCEs) monitor QA events. For many assembly packages comprehensive auditing, evaluation and testing of the assembly packages and subassemblies is required during construction or fabrication. Documentation of assembly package and subassemblies pedigree and history is audited by designated QCEs prior to installation or operation. Coordination of QA events by designated QCEs is necessary to minimize delays. Complex projects involve large numbers of designated QCEs, include engineers located off-site. Assigned business-entities and QCEs must coordinate to facilitate minimizing event delays or holds. Coordination of audits and designated QCEs is a complex task for many projects. Failure to properly schedule and perform required QA events, including audits or witness/hold points, can result in delayed system operation, extended or additional maintenance, and increased system cost.

SUMMARY OF INVENTION

In one aspect, a method is provided for coordinating QA event schedules using a network-based system. The system includes a server system coupled to a database and at least one client system. The method includes receiving QA event data and storing the QA event data in the database. The method further includes cross-referencing the QA event data, updating the database with the QA event data and providing information in response to an inquiry.

In a further aspect, a method is provided for coordinating QA event schedules using a network-based system including a server system coupled to a database and at least one client system. The method includes receiving QA event data including at least one of assigned business-entity data, assigned QCE data, assembly package identification data, initial QA event schedule data, preliminary QA event schedule data, confirmed QA event schedule data, QA event duration data, QA event location data, QA event prerequisites data, QA event results data, QA event description data, QA event comments data, and accommodations data. The method further includes storing the QA event data in the database and cross-referencing the QA event data. Cross-referencing the QA event data includes changing QA event schedules based on a QA event result or a change in related QA event schedules. The method also includes updating the database with QA event data, including adding and deleting information so as to revise QA event schedules. Additionally, the method includes providing information, including at least one of assigned business-entity data, assigned QCE data, assembly package identification data, initial QA event schedule data, preliminary QA event schedule data, confirmed QA event schedule data, QA event duration data, QA event location data, QA event prerequisites data, QA event results data, QA event description data, QA event comments data, and accommodations data, in response to an inquiry. Providing information includes downloading requested information from the server system and displaying requested information on the client system. The inquiry including utilizing at least one of pull-down lists, check boxes, and hypertext links.

In another aspect, a network-based system for coordinating QA event schedules is provided. The network-based system includes a client system with a browser, a database for storing information and a server system configured to be coupled to the client system and the database. The server system is further configured to receive QA event data, store the QA event data in the database, update the database with QA event data, cross-reference the QA event data against a schedule, and provide information in response to an inquiry.

In a further aspect, a computer program embodied on a computer readable medium is provided for coordinating QA event schedules. The program includes a code segment that receives QA event data and then maintains a database by adding, deleting and updating QA event data. The program also generates at least one QA event schedule based on the received QA event data and provides the QA event schedules to users.

BRIEF DESCRIPTION OF DRAWINGS

FIG. 10 is an exemplary embodiment of a user interface of QCS displaying an Add Quality Control Engineer template.

FIG. 11 is an exemplary embodiment of a user interface of QCS displaying a Composite View Schedule for a selected plant.

DETAILED DESCRIPTION

Figure 1:
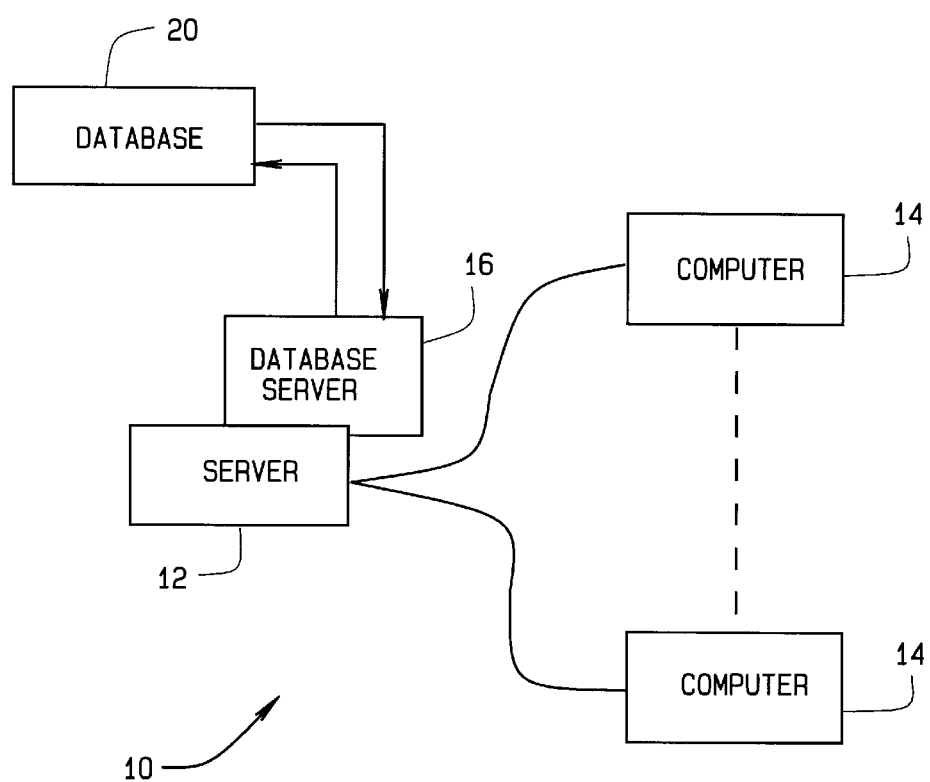
FIG. 1 is a simplified block diagram of a QA event coordination system (QCS) in accordance with one embodiment of the present invention.

Exemplary embodiments of systems and processes that facilitate integrated network-based electronic reporting and workflow process management related to the QA event Coordination System (QCS) are described below in detail. The systems and processes facilitate, for example, electronic submission of information using a client system, automated extraction of information, and web-based reporting for internal and external system users.

The QCS collects, tracks, schedules, and disseminates real time information regarding QA events. In an exemplary embodiment, a network-based QCS collects, tracks, and disseminates real time information regarding QA events of a boiling water reactor (BWR) plant. In another embodiment, QCS collects, tracks, schedules and disseminates information regarding QA events on other plants or systems including, but not limited to, boiling water reactor (BWR), pressurized water reactor (PWR), liquid metal reactor (LMR), aircraft, ships or other transportation systems. The QA event schedules in the QCS are used by multiple business-entities including customers or buyers, primary contractors, subcontractors, third-party inspectors and regulators.

QA event data relating to each assembly package of a plant or system is received by QCS which stores the information in a database, updates the database with information received, cross-references the information received and provides information in response to an inquiry. QA event data includes, but is not limited to, the identity of each assembly package associated with the event, the procedure number associated with the event, the business-entity designated with responsibility for the QA event, the designated QCE, the scheduled date for the QA event, prerequisites for the QA event, the time allocated to complete the QA event, the QA event location, QA event prerequisites data, QA event results data, QA event description data, QA event comments data, accommodations data, and support facilities available for QCEs at the QA event location. In preliminary stages, QA event data may be incomplete but still provide useful information. The system provides a schedule of future QA events sortable by preset time frame, assembly package, business-entity, or QCE. The system allows access to the most recent information, which was previously not possible. The system also provides a responsive assessment of QA event schedule changes facilitating better utilization of resources. Delays in QA events generate costly plant operability delays and wasted travel expenses for the QCEs involved.

In the QCS, QA event data is stored in the database. The network based QCS provides convenient access to QA event data, including original schedules, preliminary schedules and confirmed schedules. Once into the QCS home page, the user has an option to access information on assembly packages that require QA events. In an exemplary embodiment, for each QA event, an authorized user can access the information.

In one embodiment, the system is a computer program embodied on a computer readable medium implemented utilizing a Structured Query Language (SQL) with a client user interface front-end for administration and a web interface for standard user input and reports. In an exemplary embodiment, the system is web enabled and is run on a business-entity's intranet. In yet another embodiment, the system is fully accessed by individuals having an authorized access outside the firewall of the business-entity through the Internet. In a further exemplary embodiment, the system is being run in a Windows NT environment. The application is flexible and designed to run in various different environments without compromising any major functionality.

The systems and processes are not limited to the specific embodiments described herein. In addition, components of each system and each process can be practiced independent and separate from other components and processes described herein. Each component and process also can be used in combination with other assembly packages and processes.

FIG. 1 is a simplified block diagram of an QA event Coordination System (QCS) 10 including a server system 12, and a plurality of client sub-systems, also referred to as client systems 14, connected to server system 12. In one embodiment, client systems 14 are computers including a web browser, such that server system 12 is accessible to client systems 14 via the Internet. Client systems 14 are interconnected to the Internet through many interfaces including a network, such as a local area network (LAN) or a wide area network (WAN), dial-in-connections, cable modems and special high-speed ISDN lines. Client systems 14 could be any device capable of interconnecting to the Internet including a web-based phone, personal digital assistant (PDA), or other web-based connectable equipment. A database server 16 is connected to a database 20 containing information on a variety of assembly packages, as described below in greater detail. In one embodiment, centralized database 20 is stored on server system 12 and can be accessed by potential users at one of client systems 14 by logging onto server system 12 through one of client systems 14. In an alternative embodiment database 20 is stored remotely from server system 12 and may be non-centralized.

Figure 2:
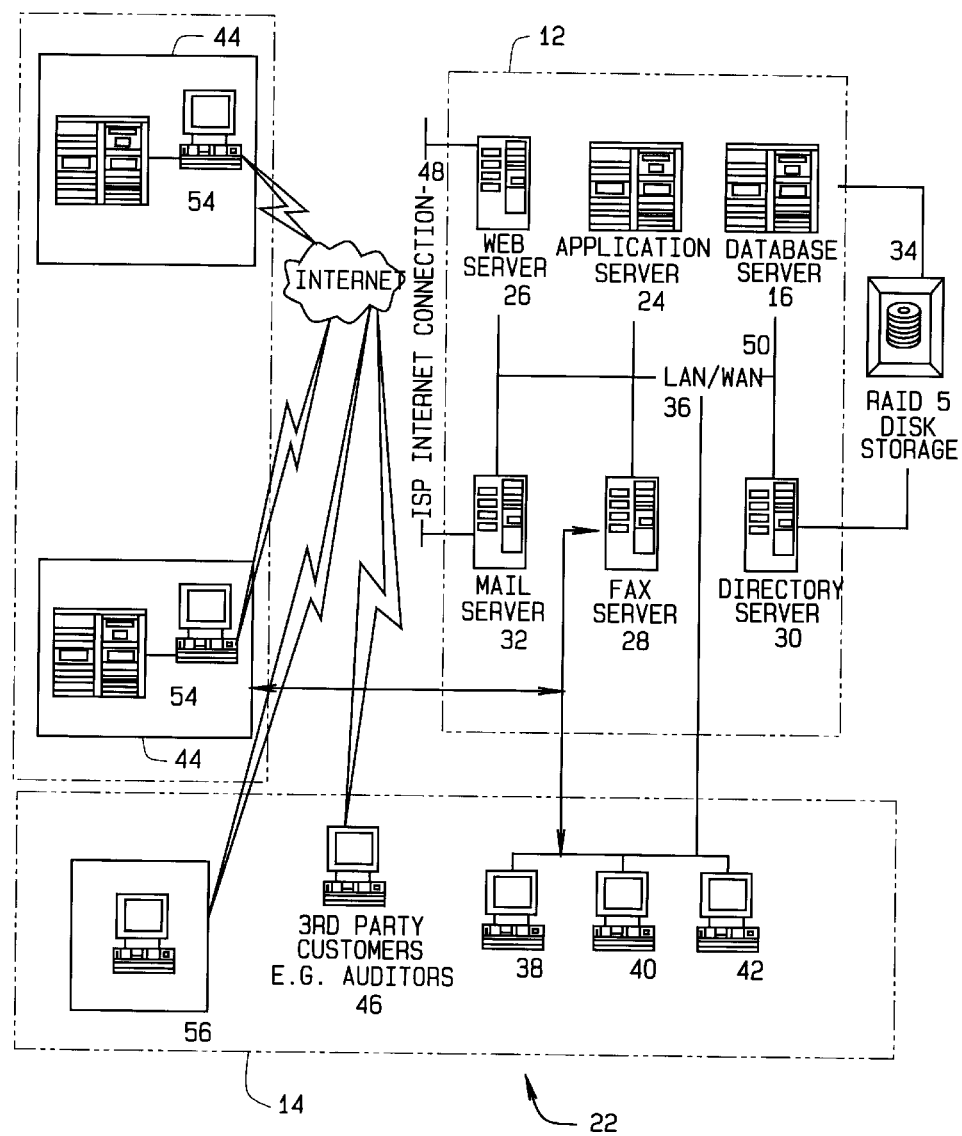
FIG. 2 is an expanded version block diagram of an exemplary embodiment of a server architecture of the QCS.

FIG. 2 is an expanded version block diagram of an exemplary embodiment of a server architecture of a QA event Coordination System (QCS) 22. Components in system 22, identical to components of system 10 (shown in FIG. 1), are identified in FIG. 2 using the same reference numerals as used in FIG. 1. System 22 includes server system 12 and client systems 14. Server system 12 further includes database server 16, an application server 24, a web server 26, a fax server 28, a directory server 30, and a mail server 32. A disk storage unit 34 is coupled to database server 16 and directory server 30. Servers 16, 24, 26, 28, 30, and 32 are coupled in a local area network (LAN) 36. In addition, a system administrator's workstation 38, a user workstation 40, and a supervisor's workstation 42 are coupled to LAN 36. Alternatively, workstations 38, 40, and 42 are coupled to LAN 36 via an Internet link or are connected through an Intranet.

Each workstation, 38, 40, and 42 is a personal computer having a web browser. Although the functions performed at the workstations typically are illustrated as being performed at respective workstations 38, 40, and 42, such functions can be performed at one of many personal computers coupled to LAN 36. Work stations 38, 40, and 42 are illustrated as being associated with separate functions only to facilitate an understanding of the different types of functions that can be performed by individuals having access to LAN 36.

Server system 12 is configured to be communicatively coupled to various individuals, including employees 44 and QCEs 46, via an ISP Internet connection 48. The communication in the exemplary embodiment is illustrated as being performed via the Internet, however, any other wide area network (WAN) type communication can be utilized in other embodiments, i.e., the systems and processes are not limited to being practiced via the Internet. In addition, and rather than WAN 50, local area network 36 could be used in place of WAN 50.

In the exemplary embodiment, any authorized individual or business-entity having a workstation 54 can access QCS 22. One of the client systems includes a senior manager's workstation 56 located at a remote location. Work stations 54 and 56 are personal computers having a web browser. Also, work stations 54 and 56 are configured to communicate with server system 12. Furthermore, fax server 28 communicates with employees located outside the business-entity's 44 and any of the remotely located client systems, including a client system 56 via a telephone link. Fax server 28 is configured to communicate with other client systems 38, 40, and 42 as well.

Figure 3:
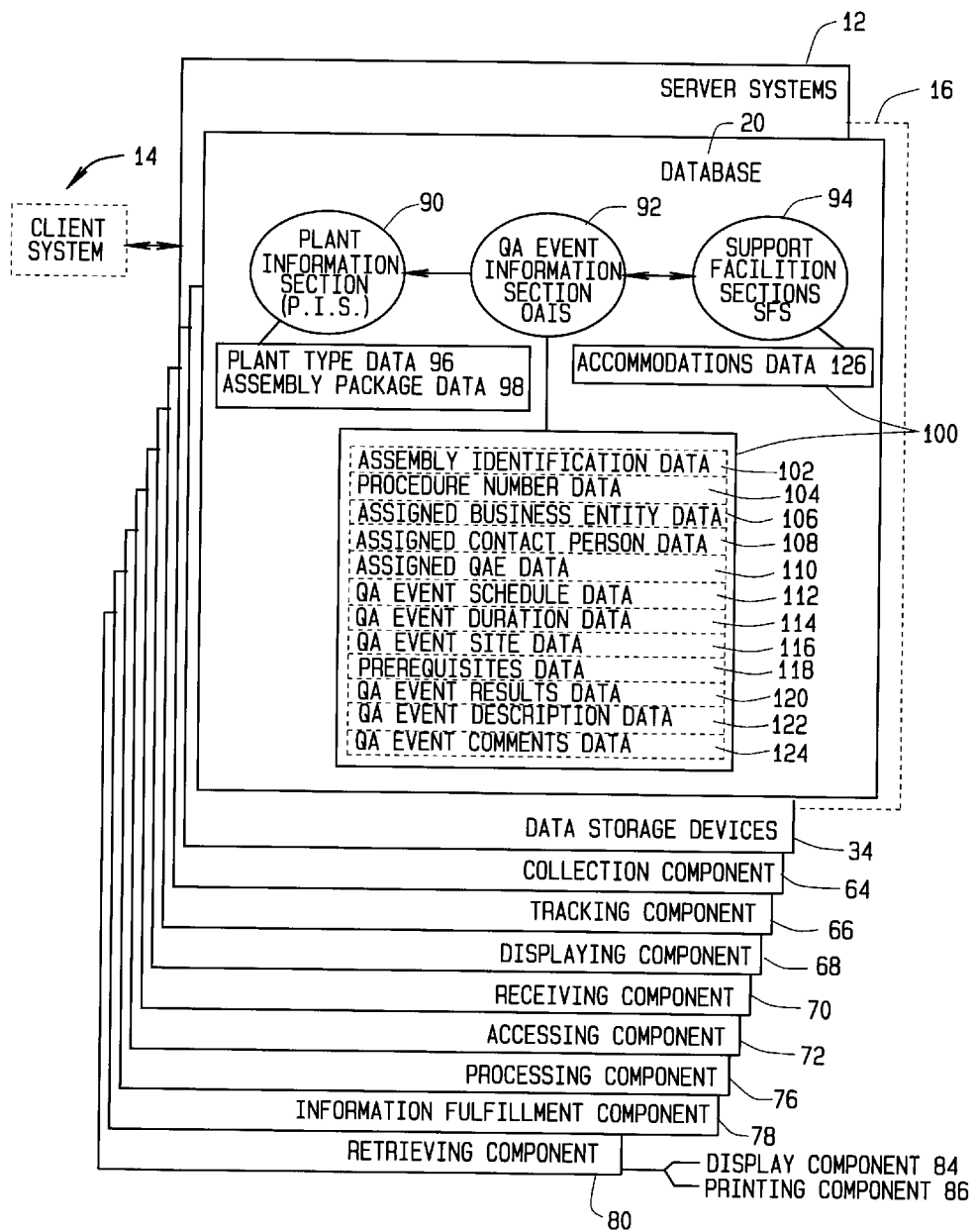
FIG. 3 shows a configuration of a database within the database server of the server system with other related server components.

FIG. 3 shows a configuration of database 20 within database server 16 of server system 12 shown in FIG. 1. Database 20 is coupled to several separate computer software components within server system 12, which perform specific tasks. Server system 12 includes a collection component 64 for collecting data from users in database 20, a tracking component 66 for tracking data, and a displaying component 68 to display information. Tracking component 66 tracks and cross-references data, including modifying existing data. Server system 12 also includes a receiving component 70 to receive a specific query from client system 14, and an accessing component 72 to access database 20 within data storage device 34. Receiving component 70 is programmed for receiving a query from one of a plurality of users. Server system 12 further includes a processing component 76 for searching and processing received queries against database 20 containing a variety of information collected by collection component 64. An information fulfillment component 78, located in server system 12, downloads the requested information to the plurality of users in response to the requests received by receiving component 70. Information fulfillment component 78 downloads the information after the information is retrieved from database 20 by a retrieving component 80. Retrieving component 80 retrieves, downloads and sends information to client system 14 based on a query received from client system 14.

Retrieving component 80 further includes a display component 84 configured to download information to be displayed on a client system's graphical user interface and a printing component 88 configured to print information. Retrieving component 80 generates reports requested by the user through client system 14 in a pre-determined format. System 10 is flexible to provide other alternative types of reports and is not constrained to the options set forth above. In one embodiment, collection component 64, tracking component 66, displaying component 68, receiving component 70, processing component 76, information fulfillment component 78, retrieving component 80, display component 84, and printing component 88 are computer programs embodied on computer readable medium.

Database 20 is divided into a Plant Information Section (PIS) 90, a QA event Information Section (QAIS) 92, and a Support Facilities Section (SFS) 94. PIS 90 contains information specific to each plant. PIS 90, QAIS 92, and SFS 94 facilitate database 20's storage of QA schedules.

PIS 90 includes information relevant to QA event data for each plant including, but not limited to, plant type data 96 and assembly package data 98. Assembly packages data 98 includes data on assembly packages used in the plant or system. Assembly packages vary from plant to plant, as can QA events. The assembly packages classified in a BWR may be different than the assembly packages classified in a PWR. Even in plants of the same type, assembly packages classified in a first BWR may differ from the assembly packages classified in a second BWR. In an exemplary embodiment, a partial list of assembly packages classified include: RPV Refueling Bellows, Containment Hydrogen Recombiner, ASME Section VIII Heat Exchangers, ASME Section III Heat Exchangers I, ASME Section III Heat Exchangers II, RCIC Drain Tank and Drain Pump, RPV Servicing Equipment 1, RPV Servicing Equipment 2, Main Steam Line Plugs, and RPV Head Stud Tensioner. Classified assembly packages can be further divided into subassembly groups.

QAIS 92 contains includes information relevant to QA event data 100 associated with assembly packages. In one embodiment, QA event data 100 includes assembly package identification data 102 for each assembly package, procedure number data 104 associated with each QA event, assigned business-entity data 106 including the business-entity assigned responsibility for the QA event, assigned personnel data 108, assigned QCE data 110, QA event schedule data 112, QA event duration data 114, and QA event location data 116 regarding the physical location of the event. QA event schedule data 112 includes the date the QA event is anticipated to occur. This date is subject to change and QA event schedule data 112 can include an initial schedule date, a preliminary schedule date, and a confirmed schedule date. QAIS 92 further contains prerequisites data 118, regarding relationships between different QA events, QA event results data 120, QA event description data 122, and QA event comments data 124, providing details and updates regarding the QA event. On occasions, an assembly package will not satisfactorily complete a QA event or other circumstances will delay the planned performance of a QA event. Related QA events may require a delay or rescheduling before they can be completed. Tracking component 66 applies prerequisites data 118 and the relationships described to revise stored QA event data and QA event schedules based on received QA event data 100, including, but not limited to QA event results data 120 and QA event schedule data 112. Revisions or modifications to one stored QA event schedule can effect other related QA event schedules. The plant conditions can generate conflicts between QA events, the same QAEs may be required for QA events in both QA event schedules, or the same equipment may be required for QA events on different QA schedules. Tracking component 66 also updates database 20 as it revises QA event schedules.

SFS 94 contains QA event data 100 regarding support facilities available for QCEs at the QA event site. In one embodiment, SFS 94 includes accommodations data 126 regarding hotels and lodgings supporting the QA event location. QCEs frequently come from off-site locations and such information facilitates the QA event.

System 10 accumulates a variety of confidential data. Therefore, system 10 has different access levels to control and monitor the security of the system. Authorization for access is assigned by system administrators on a need to know basis. In one embodiment, system 10 provides access based on job functions. In yet another embodiment, system 10 provides access based on business-entity. The administration/editing capabilities within system 10 are also restricted to ensure that only authorized individuals have access to modify or edit the data existing in the system. System 10 manages and controls access to system data and information.

The architectures of system 10 as well as various components of system 10 are exemplary only. Other architectures are possible and can be utilized in connection with practicing the processes described below.

Figure 4:
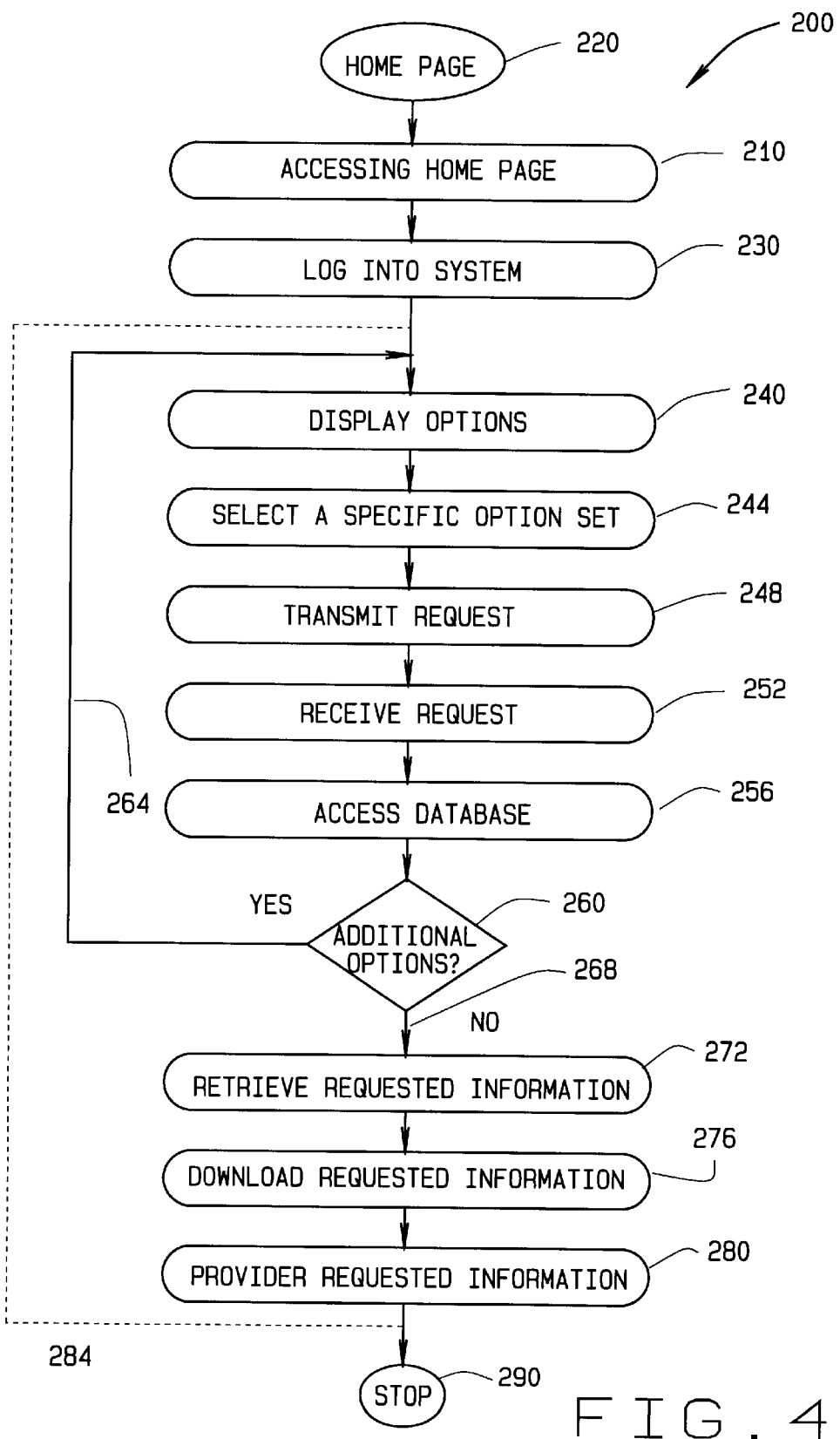
FIG. 4 is a flowchart of the processes employed by QCS to facilitate use.

FIG. 4 is a flowchart 200 of the processes employed system 10 to facilitate use. Initially, the user accesses 210 user interface 220 of the web site through client system 14 (shown in FIG. 1). In one embodiment, client system 14, as well as server system 12, are protected from access by unauthorized individuals. The user is required to log-in 230 to system 10 using a password (not shown) or an employee payroll number for security. User interface 220 displays options 240 available to the user through links, check boxes, or pull-down lists on client system 14. Once the user selects an option 244 (in one embodiment, relating to business-entity and event type) from the available links, the request is transmitted 248 to server system 12. Transmitting 248 the request is accomplished either by click of a mouse or by a voice command. Once server system 12 (shown in FIG. 1) receives 252 the request, server system 12 accesses 256 database 20 (shown in FIG. 1). System 10 determines 260 if additional narrowing options are available. In one embodiment, additional narrowing options include assembly package selection pull-down lists. If additional narrowing options are available 264 system 10 displays 240 the options relating to the prior option selected to the user on client system 14. The user selects 244 the desired option and transmits the request 248. Server system 12 receives the request 252 and accesses 256 database 20. When system 10 determines additional options 260 are not available 268, system 10 retrieves 272 requested information from database 20. The requested information is downloaded 276 and provided 280 to client system 14 from server 12. The user can continue to search 284 database 20 for other information or exit 290 from system 10.

Figure 5:
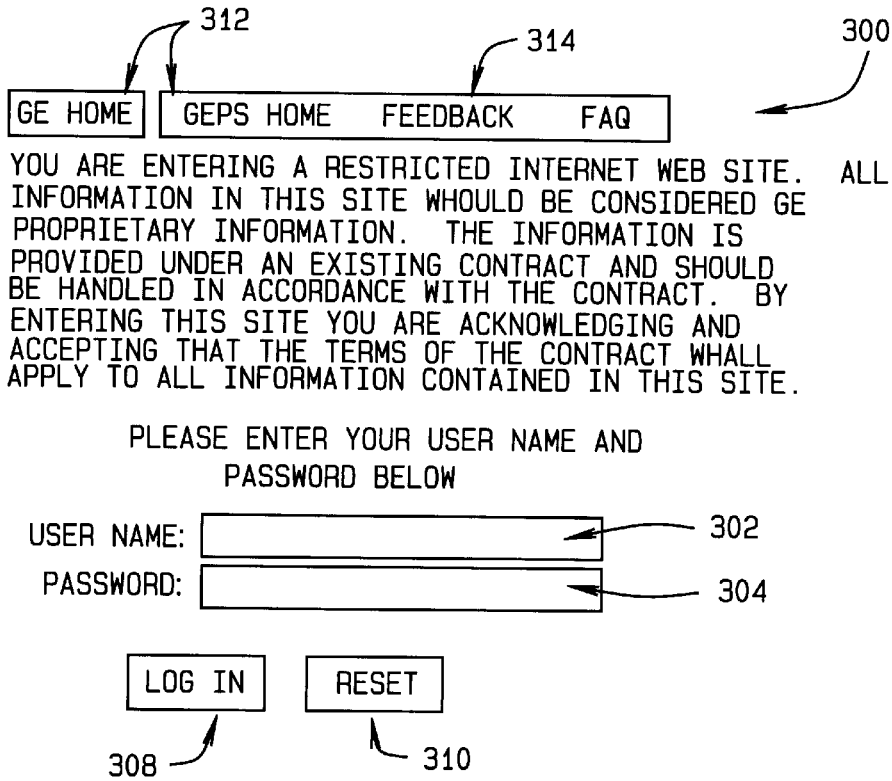
FIG. 5 is an exemplary embodiment of a user interface displaying a home page of QCS.

FIG. 5 is an exemplary embodiment of a user interface 300 displaying a home page of QCS 10 (shown in FIG. 1). User interface 300 requires the user to provide a valid user name 302 and a valid user password 304 to access QCS 10. User interface 300 allows the user to login system 10 and is linked to database 20. Home Page 300 is the entry point for anyone trying to access QA event database 20 via the web. In another embodiment, the user can login to a selected plant. A "Login" button 308 and a "Reset" button 310 are provided. Selection of the Login button 308 after entry of valid user name 302 and user password 304 provides the next interface. In one embodiment, user interface 300 displays links facilitating the selection of alternative systems 312 or aids 314.

Figure 6:
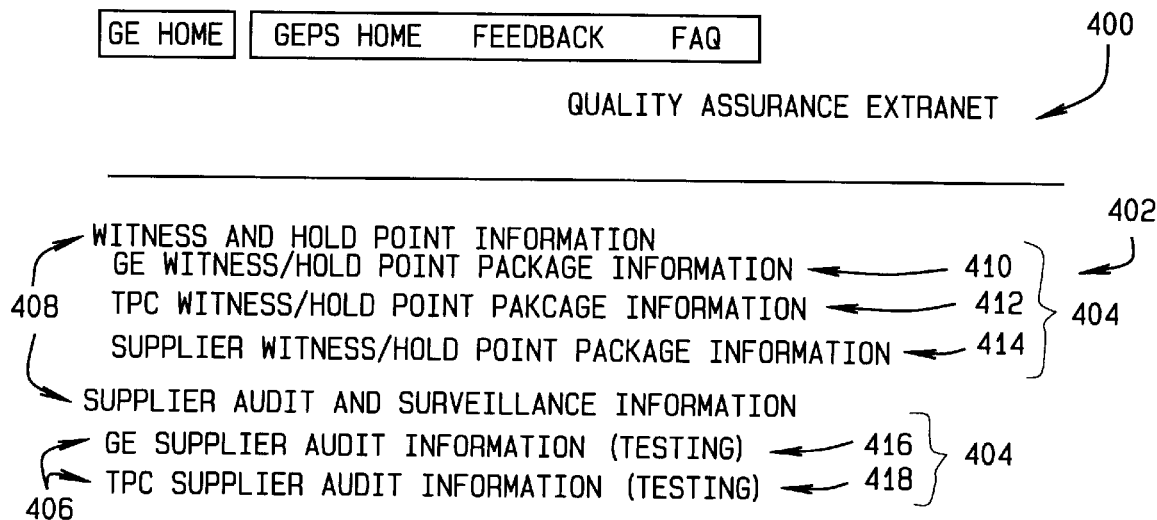
FIG. 6 is an exemplary embodiment of a user interface of QCS displaying business-entity and event type selection options.

FIG. 6 is an exemplary embodiment of a user interface 400 of QCS 10 displaying business-entity and event type selection options 402. In one embodiment, user interface 400 is displayed on the client system 14 once the user has logged into QCS 10 (shown in FIG. 5). User interface 400 facilitates filtering QA event data 100 for the selected plant. User Interface 400 provides user selectable hyperlink options 404 to narrow QA event data based on an assigned business-entity 406 and a QA event type 408. In an exemplary embodiment, General Electric (GE) Witness/Hold Point Package Information link 410, Third Party Company (TPC) Witness/Hold Point Package Information link 412, and Supplier Witness/Hold Point Package Information link 414 are provided. GE Supplier Audit Information link 416 and TPC Supplier Audit Information link 418 are also provided by user interface 400. In another embodiment, pull-down list are utilized to narrow the selected QA event data. Selection of a link 410, 412, 414, 416, 418 transmits that selection to system 10, which provides the next user interface.

Figure 7:
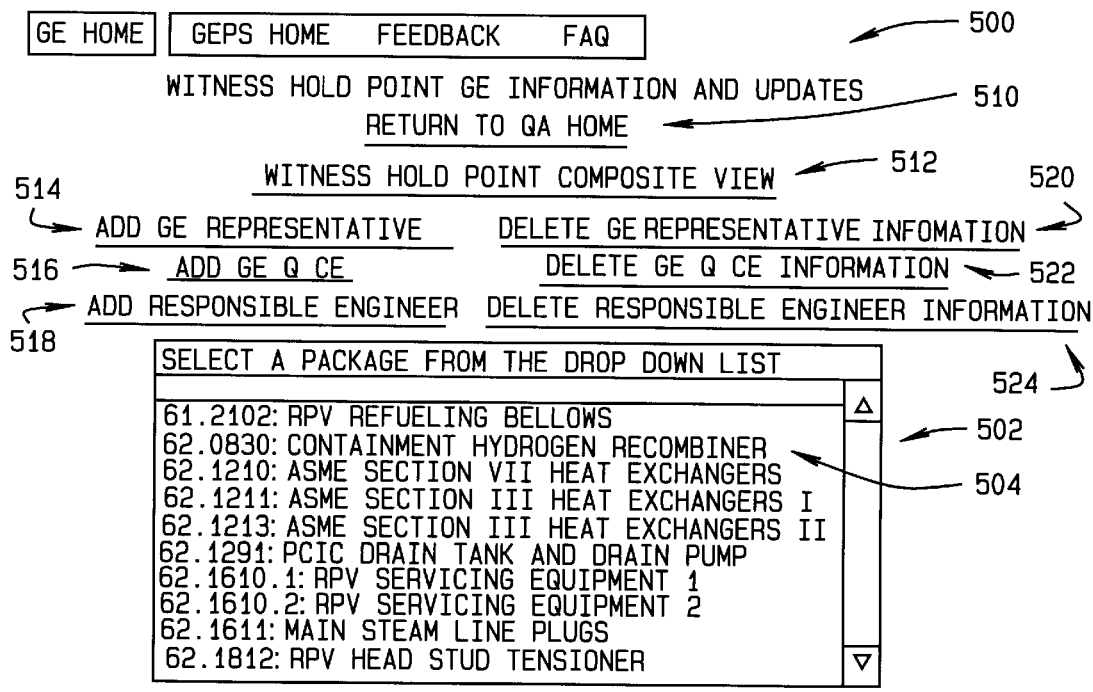
FIG. 7 is an exemplary embodiment of a user interface of QCS displaying assembly package selection options.

FIG. 7 is an exemplary embodiment of a user interface 500 of QCS 10 displaying assembly package selection options 502. In one embodiment, user interface 500 is displayed on the client system 14 once the user has selected an assigned business-entity 406 and QA event type 408 (shown in FIG. 6). In an exemplary embodiment, user interface 500 displays a portion of assembly packages selection options 502 associated with GE Witness/Hold Point Package Information link 410 (shown in FIG. 6) in a drop down list for user selection. In another embodiment, system 10 displays assembly packages selection options 502 in a hypertext link format. In one embodiment, each specific assembly package selection option 502 is an active link that can be selected by placing the pointer or mouse cursor on the desired assembly package and clicking or selecting by voice command. A return link 510 is available to return the user to user interface 300. A Composite View link 512 is selectable by the user to facilitate review of QA event data 100 in a composite or time frame display. User interface 500 also provides a Add GE Representative link 514, a Add GE QCE link 516, a Add Responsible Engineer link 518, an Update GE Representative Information link 520, an Update GE QCE Information link 522, and an Update Responsible Engineer Information link 524.

Figure 8:
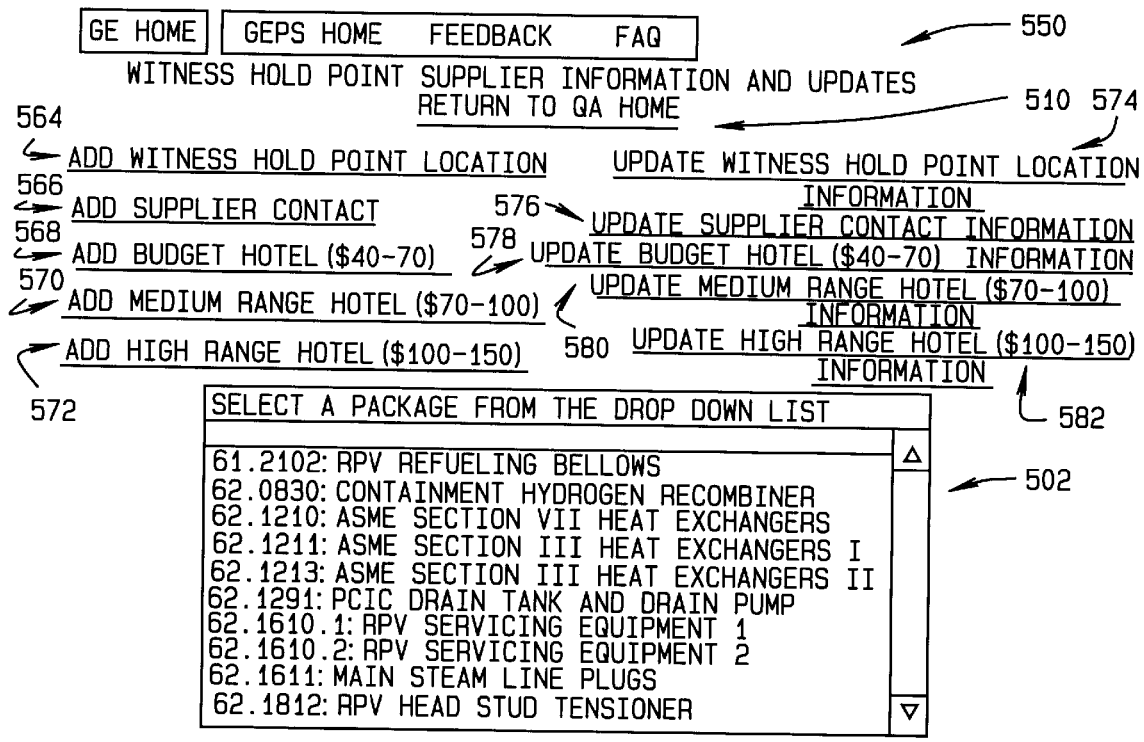
FIG. 8 is an exemplary embodiment of a user interface of QCS displaying assembly package selection options for a supplier.

FIG. 8 is an exemplary embodiment of a user interface 550 of QCS 10 displaying assembly package selection options 502 for a supplier. Similar to user interface 500, user interface 550 is displayed on the client system 14 once the user has selected an assigned business-entity 406 and QA event type 408 (shown in FIG. 6). In an exemplary embodiment, user interface 550 displays a portion of assembly packages selection options 502 associated with Supplier Witness/Hold Point Package Information link 414 (shown in FIG. 6) in a drop down list for user selection. User interface 550 provides a Add Witness Hold Point Location link 564, a Add Supplier Contact link 566, a Add Budget Hotel link 568, a Add Medium Hotel link 570, a Add High Range Hotel link 572, a Update Witness Hold Point Location link Information 574, a Update Supplier Contact Information link 576, a Update Budget Hotel Information link 578, a Update Medium Hotel Information link 580, and a Update High Range Hotel Information link 582. Links 564, 566, 568, 570, 572, 574, 576, 578, 580 and 582 facilitate receiving and storing QA event data in database 20.

Figure 9:
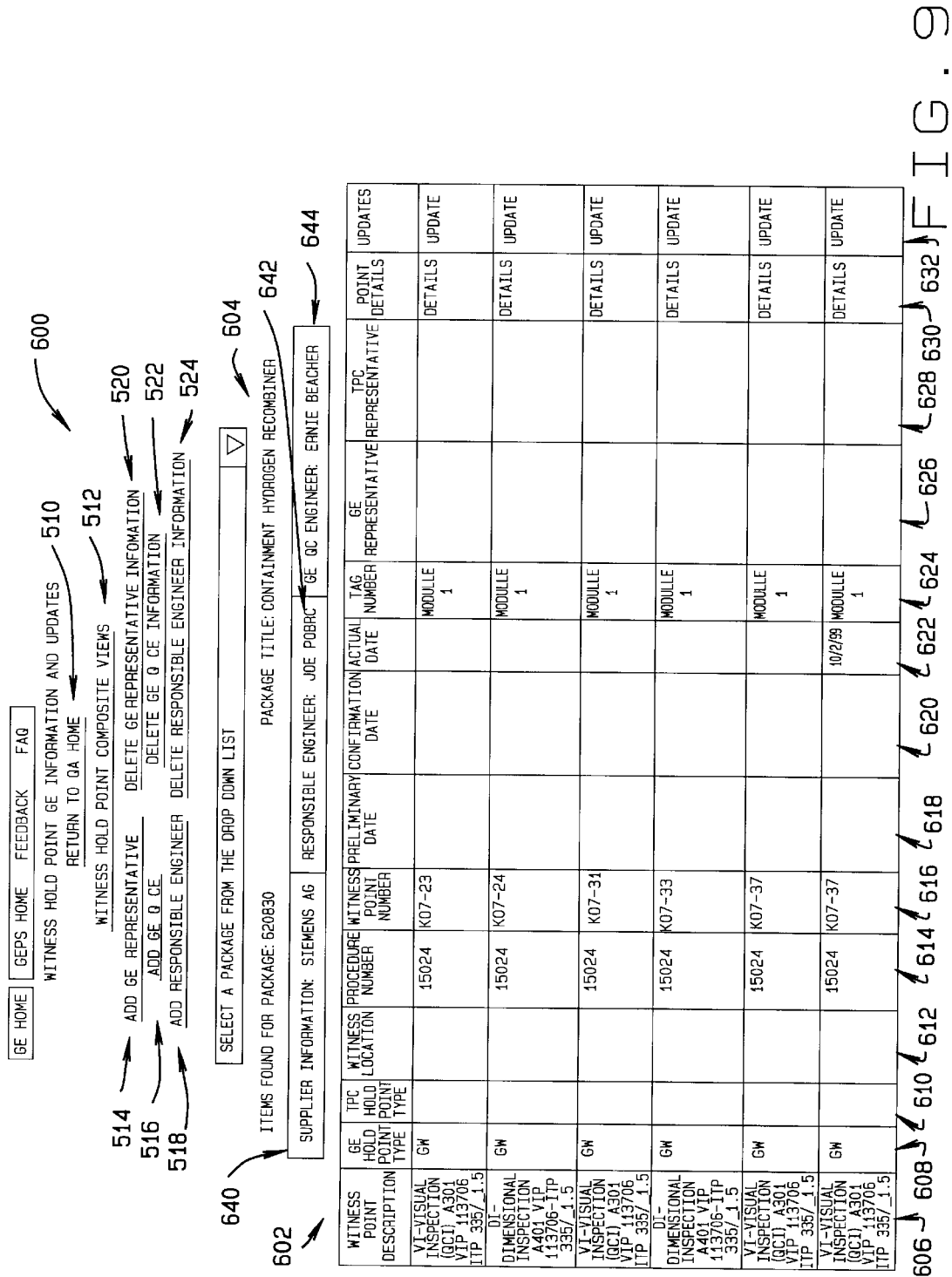
FIG. 9 is an exemplary embodiment of a user interface of QCS displaying a QA event schedule for a specific assembly package selection option.

FIG. 9 is an exemplary embodiment of a user interface 600 of QCS 10 displaying a QA event schedule 602 for a specific assembly package selection option 504 (shown in FIG. 7). QA event schedule 602 includes QA event data 100 for selected assembly package option 604. User interface 600 is displayed on the client system 14 when the user selects a specific assembly package selection option 504 from user interface 500. In an exemplary embodiment, QA event schedule 602 includes title of the selected assembly package option 604, Witness Point Description 606, GE Hold point type 608, TPC Hold Point Type 610, Witness Location 612, Procedure Number 614, Witness Point Number 616, Preliminary Date 618, Confirmation Date 620, Actual Date 622, Tag Number 624, GE Representative 626, TPC Representative 628, Point Details 630, and Updates 632. In an exemplary embodiment, Point Details 630 and Updates 632 provide links to additional information relevant to the listed Witness Point. User interface 600 also provides Supplier Information 640, Responsible Engineer Information 642 and GE QC Engineer Information 644 for the selected assembly package option 604. User interface 600 also provides return link 510, Composite View link 512, Add GE Representative link 514, Add GE QCE link 516, Add Responsible Engineer link 518, Update GE Representative Information link 520, Update GE QCE Information link 522, and Update Responsible Engineer Information link 524.

FIG. 10 is an exemplary embodiment of a user interface 700 of QCS 10 displaying an Add Quality Control Engineer template 702. System 10 provides user interface 700 in response to Add GE QCE link 516 (shown in FIGS. 7 and 8). User interface 700 facilitates the addition of information regarding a specific QCE. Specifically, information necessary to contact the selected QCE is provided to system 10. In an exemplary embodiment, template 702 allows addition of QCE name 708, QCE Telephone Number 710, QCE Fax Number 712, QCE Address 714, QCE Pager Number 716, QCE Cell Phone Number 718, and QCE Email 720. System 10 provides similar user interfaces in response to Add GE Representative link 514, Add Responsible Engineer link 518, Update GE Representative Information link 520, Update GE QCE Information link 522, and Update Responsible Engineer Information link 524 (shown in FIG. 9).

Figure 11:
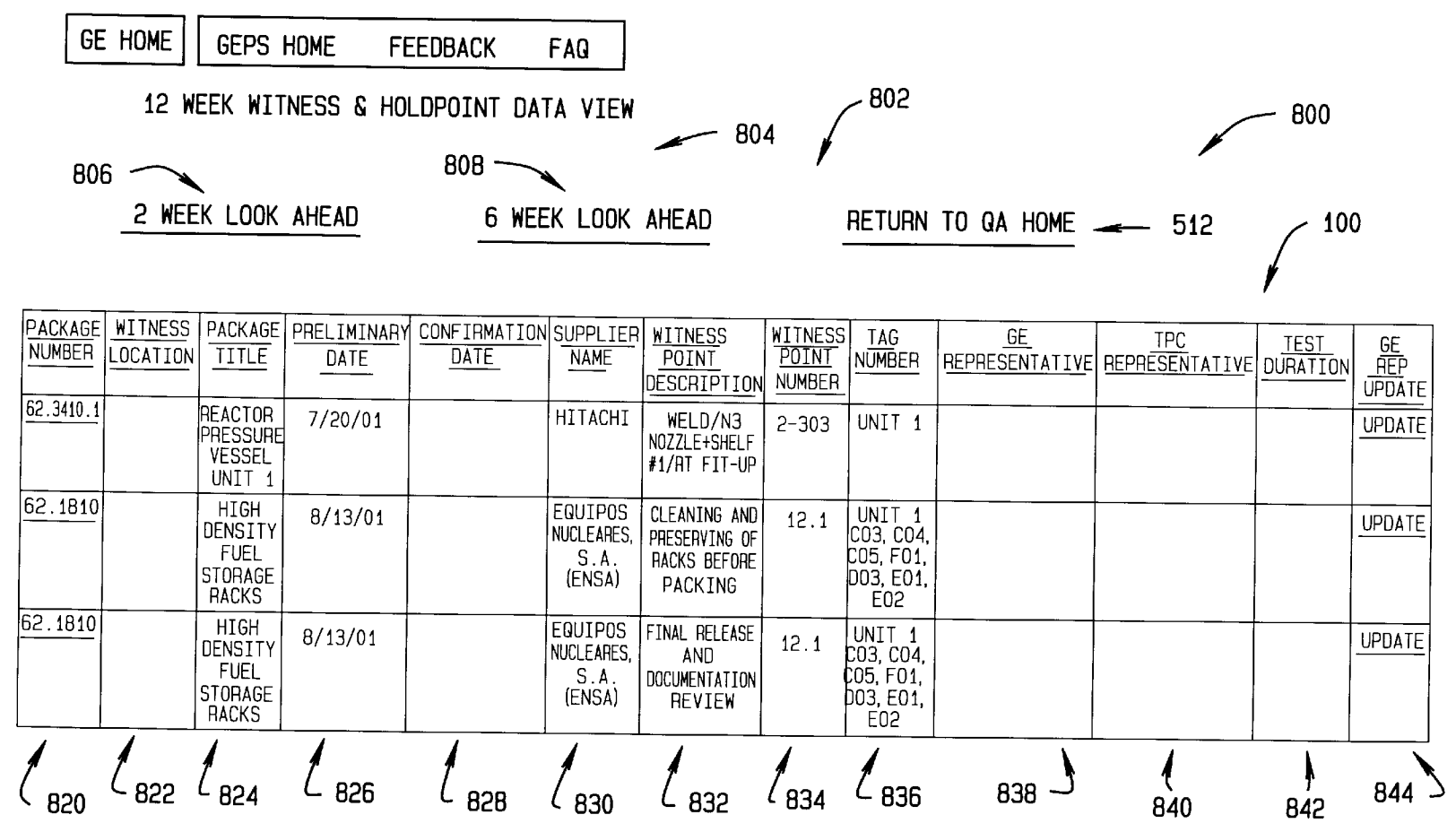

FIG. 11 is an exemplary embodiment of a user interface 800 of QCS 10 displaying a Composite View Schedule (CVS) 802 for the selected plant. CVS 802 includes QA event data 100 for assembly package options 502 for a predetermined time frame. User interface 800 is displayed on the client system 14 when the user selects Witness Hold Point Composite View 512 (shown in FIGS. 7 and 9). In an exemplary embodiment, CVS 802 displays QA event data 100 for witness/holdpoints scheduled for twelve weeks from the system date, sometimes referred to as the initial schedule. CVS 802 includes time frame selectors 804. In an exemplary embodiment, a 2 Week Look Ahead link 806 provides a display of QA event data 100 for witness/holdpoints scheduled for two weeks from the system date, sometimes referred to as the confirmed schedule, while a 6 Week Look Ahead link 808 displays QA event data 100 for witness/holdpoints scheduled for six weeks from the system date, sometimes referred to as the preliminary schedule. User interface 800 also provides return link 510 to return the user to interface 300. In an exemplary embodiment, CVS 802 includes Package Number 820, Witness Location 822, Package Title 824, Preliminary Date 826, Confirmation Date 828, Supplier Name 830, Witness Point Description 832, Witness Point Number 834, Tag Number 836, GE Representative 838, TPC Representative 840, Test Duration 842, and GE Rep Update 844. In an exemplary embodiment, GE Rep Update 844 provides a link to additional information relevant to the listed Witness Point.

As described, QCS 10 includes a database 20 for QA event data related to selected plants and assembly packages, which provides reliable and up-to-date QA schedule information. QCS 10 also provides information regarding supporting personnel and facilities. QCS 10 reduces paper-based information by providing on-line up-to-date current information, which is essential in day-to-day coordination quality control in government regulated industries.

In addition, QCS provides electronic user notification flexibility (not shown) that includes notification of changes affecting QA events including, but not limited to, updated QA event schedules, manufacturer's Safety Information Letters (SILs), and QA event results data. This notification may be in the form of an e-mail that is automatically sent to the user, or a note on a business-entity website.

QCS provides multiple users with access to a single information source including a comprehensive QA event schedule. QCS allows the user to track and evaluate QA event schedule changes and progress. QCS provides valuable services to the customer, third party companies, QCEs and service personnel who are involved in plant support.

While the invention has been described in terms of various specific embodiments, those skilled in the art will recognize that the invention can be practiced with modification within the spirit and scope of the claims.

What is claimed is:

1. A method for coordinating nuclear reactor QA event schedules using a network-based system including a server system coupled to a database and at least one client system, said method comprising:

receiving nuclear reactor QA event data that includes information regarding reactor plant type data and information regarding assembly package data including at least one of reactor pressure vessel refueling bellows assembly packages, containment hydrogen recombiner assembly packages, heat exchanger assembly packages, drain tank and drain pump assembly packages, reactor pressure vessel servicing equipment assembly packages, main steam line plugs assembly packages, and reactor pressure vessel heat stud tensioner assembly packages;

storing the QA event data in the database, the database comprising a Plant Information Section, a QA Event Information Section, and a Support Facilities Section;

cross-referencing the QA event data to the QA event schedules;

updating the database with the QA event data; and providing information in response to an inquiry.

2. A method in accordance with claim 1 wherein receiving QA event data comprises receiving at least one of assigned business-entity data, assigned contact person data, assigned QCE data, assembly package identification data, procedure number data, initial QA event schedule data, preliminary QA event schedule data, confirmed QA event schedule data, QA event duration data, QA event location data, QA event prerequisites data, QA event results data, QA event description data, QA event comments data, and accommodations data.

3. A method in accordance with claim 1 wherein cross-referencing the QA event data comprises changing a QA event schedule based on QA event results data.

4. A method in accordance with claim 1 wherein cross-referencing the QA event data comprises changing QA event schedules based on a change in other related QA event schedules.

5. A method in accordance with claim 1 wherein updating the database comprises adding and deleting QA event data.

6. A method in accordance with claim 1 wherein updating the database comprises revising QA event schedules.

7. A method in accordance with claim 1 wherein providing information comprises:

downloading requested information from the server system; and displaying requested information on the client system in response to the inquiry.

8. A method in accordance with claim 1 wherein providing information comprises:

displaying information on the client system identifying at least one of a witness/hold point event and an audit event; and receiving an inquiry from the client system regarding at least one of a witness/hold point event and an audit event.

9. A method in accordance with claim 1 wherein providing information comprises:

displaying information on the client system identifying an option relating at least one of an initial QA event schedule, a preliminary QA event schedule and a confirmed QA event schedule; and receiving an inquiry from the client system regarding an option relating to at least one of an initial QA event schedule, a preliminary QA event schedule and a confirmed QA event schedule.

10. A method in accordance with claim 1 wherein providing information comprises:
   displaying information on the client system identifying an option relating to an assembly package; and
   receiving an inquiry from the client system regarding an option relating to the assembly package.

11. A method in accordance with claim 1 wherein providing information comprises:
   accessing the database;
   searching the database regarding the specific inquiry;
   retrieving information from the database; and
   transmitting the retrieved information to the client system for display by the client system.

12. A method in accordance with claim 1 wherein providing information comprises providing at least one of assigned business-entity data, assigned contact person data, assigned QCE data, assembly package identification data, initial QA event schedule data, preliminary QA event schedule data, confirmed QA event schedule data, QA event duration data, QA event location data, QA event prerequisites data, QA event results data, QA event description data, QA event comments data, and accommodations data.

13. A method in accordance with claim 1 wherein providing information comprises submitting an inquiry utilizing pull-down lists.

14. A method in accordance with claim 1 wherein the client system and the server system are connected via a network, the network comprising one of a wide area network, a local area network, an intranet and the Internet.

15. A method for coordinating QA event schedules using a network-based system including a server system coupled to a database and at least one client system, said method comprising:
   receiving nuclear reactor QA event data comprising assigned business-entity data, assigned contact person data, assigned QCE data, assembly package identification data including information regarding at least one of reactor pressure vessel refueling bellows assembly packages, containment hydrogen recombiner assembly packages, heat exchanger assembly packages, drain tank and drain pump assembly packages, reactor pressure vessel servicing equipment assembly packages, main steam line plugs assembly packages, and reactor pressure vessel heat stud tensioner assembly packages, initial QA event schedule data, preliminary QA event schedule data, confirmed QA event schedule data, QA event duration data, QA event location data, QA event prerequisites data, QA event results data, QA event description data, QA event comments data, and accommodations data;
   storing the QA event data in the database;
   cross-referencing the QA event data to the QA event schedules and changing QA event schedules based on a QA event result or a change in related QA event schedules;
   updating the database with QA event data comprising adding and deleting information so as to revise QA event schedules; and
   providing information, comprising at least one of assigned business-entity data, assigned contact person data, assigned QCE data, assembly package identification data, initial QA event schedule data, preliminary QA event schedule data, confirmed QA event schedule data, QA event duration data, QA event location data, accommodations data, QA event prerequisites data, and QA event results data, for a selected assembly package, in response to an inquiry, including downloading requested information from the server system and displaying requested information on the client system, the inquiry including utilizing at least one of pull-down lists, check boxes, and hypertext links.

16. A network-based system for coordinating nuclear reactor QA event schedules, said network-based system comprising:
   a client system comprising a browser;
   a database for storing information;
   a server system configured to be coupled to said client system and said database, said server system further configured to:
      receive nuclear reactor QA event data that includes information regarding reactor plant type data and information regarding assembly package data including at least one of reactor pressure vessel refueling bellows assembly packages, containment hydrogen recombiner assembly packages, heat exchanger assembly packages, drain tank and drain pump assembly packages, reactor pressure vessel servicing equipment assembly packages, main steam line plugs assembly packages, and reactor pressure vessel heat stud tensioner assembly packages;
      store said QA event data in said database, the database comprising a Plant Information Section, a QA Event Information Section, and a Support Facilities Section;
      update said database with said QA event data;
      cross-reference said QA event data to a QA event schedule; and
      provide information in response to an inquiry.

17. A network-based system in accordance with claim 16 wherein said client system further comprises:
   a displaying component for displaying at least one of pull-down list, check box,
   and hypertext link options relating to an assembly package; and
   a sending component to send an inquiry to said server system so that said server system can process and download said requested information to said client system.

18. A network-based system in accordance with claim 16 wherein said system is configured to be protected from access by unauthorized individuals.

19. A network-based system in accordance with claim 16 wherein said server system further comprises:
   a collection component for collecting QA event data from users in said database;
   a tracking component for tracking QA event data on an on-going basis;
   a displaying component for displaying QA event data on at least one of an option relating to an assembly package;
   a receiving component for receiving an inquiry from said client system regarding at least one of an option relating to an assembly package; and
   an accessing component for accessing said database and causing said retrieved information to be displayed on said client system.

20. A network-based system in accordance with claim 16 wherein said server system further comprises a processing component for searching and processing received inquiries against said database containing information collected by said collection component.

21. A network-based system in accordance with claim 16 wherein said server system further comprises a processing component for cross-referencing at least one of QA event schedules, QA event results data, QCE data and assembly package information.

22. A network-based system in accordance with claim 16 wherein said server system further comprises a retrieving component to retrieve information from said database.

23. A network-based system in accordance with claim 16 wherein said server system further comprises an information fulfillment component that downloads said requested information after retrieving from said database.

24. A network-based system in accordance with claim 16 wherein said server system configured to provide information in response to an inquiry further configured to:

download requested information from a server system; and display requested information on a client system in response to said inquiry.

25. A computer program embodied on a computer readable medium for coordinating nuclear reactor QA event schedules, said program comprising:

a code segment that receives nuclear reactor QA event data that includes information regarding reactor plant type data and information regarding assembly package data including at least one of reactor pressure vessel refueling bellows assembly packages, containment hydrogen recombiner assembly packages, heat exchanger assembly packages, drain tank and drain pump assembly packages, reactor pressure vessel servicing equipment assembly packages, main steam line plugs assembly packages, and reactor pressure vessel heat stud tensioner assembly packages;

a code segment that maintains a database by adding, deleting and updating QA event data, the database comprising a Plant Information Section, a QA Event Information Section, and a Support Facilities Section;

a code segment that generates at least one QA event schedule based on said received QA event data; and a code segment that provides said QA event schedules to users.

26. A computer program in accordance with claim 25 further comprising a code segment that provides at least one of an option to filter QA event schedules based on at least one of assigned business-entity, event type, assembly package, and time frame.

27. A computer program in accordance with claim 25 further comprises a code segment that generates a display of at least one of an initial QA event schedule, a preliminary QA event schedule, and a confirmed QA event schedule.

28. A computer program in accordance with claim 25 further comprising:

a code segment that accesses said database;

a code segment that searches said database in response to an inquiry;

a code segment that retrieves information from said database; and a code segment that causes retrieved information to be displayed on said client system.

29. A computer program in accordance with claim 25 further comprising a code segment that monitors the security of the system by restricting access to authorized individuals.

30. A computer program in accordance with claim 25 further comprising a code segment that cross-references the QA event schedule when assembly package information is modified.

31. A computer program in accordance with claim 25 further comprising a code segment that cross-references the QA event schedule to at least one other QA event schedule when QA event data is received.

* * * * *